Jan. 30, 1968
T. A. JENKINS
3,366,152
SELF-FOLDING STRUCTURE
Filed Oct. 22, 1965
2 Sheets-Sheet 1
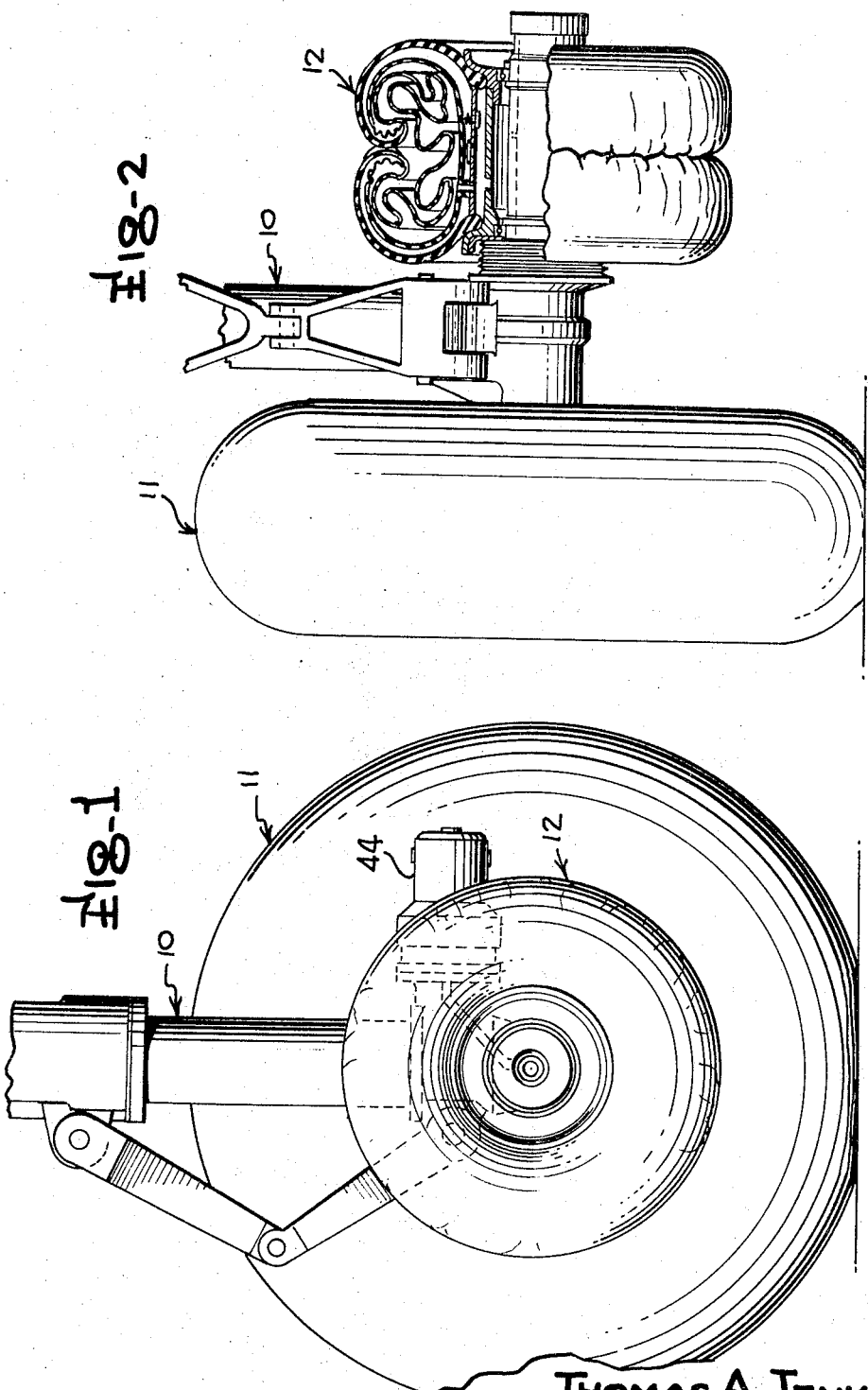
INVENTOR
THOMAS A. JENKINS
BY Mason, Fenwick & Lawrence
ATTORNEYS Jan. 30, 1968      T. A. JENKINS      3,366,152
SELF-FOLDING STRUCTURE
Filed Oct. 22, 1965      2 Sheets-Sheet 2
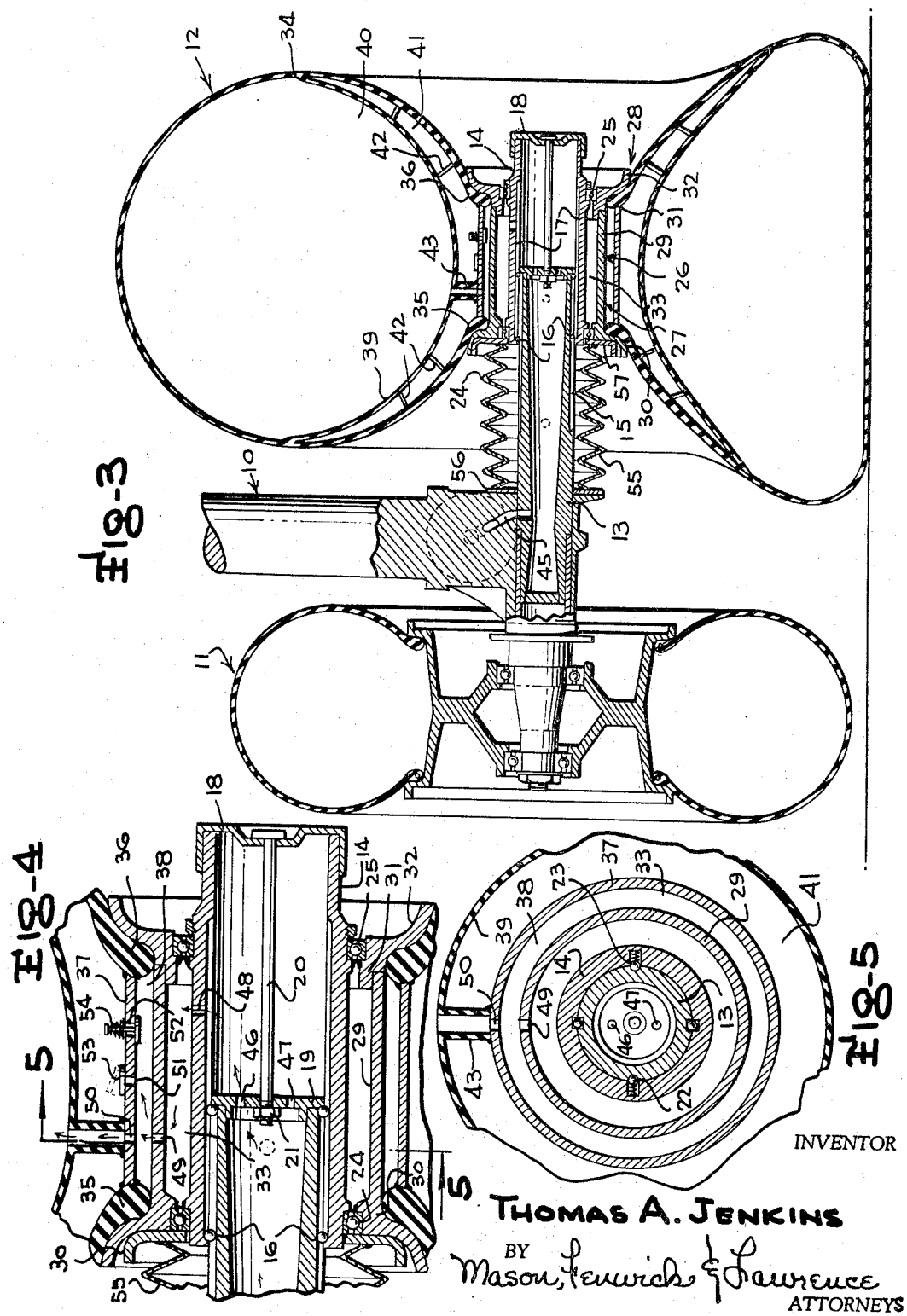
INVENTOR
THOMAS A. JENKINS
BY Mason, Fenwick & Lawrence
ATTORNEYS

United States Patent Office 3,366,152
Patented Jan. 30, 1968

3,366,152
SELF-FOLDING STRUCTURE
Thomas A. Jenkins, Malvern, Pa., assignor to Piasecki Aircraft Corporation, Philadelphia, Pa., a corporation of Pennsylvania
Filed Oct. 22, 1965, Ser. No. 500,948
9 Claims. (Cl. 152—339)

ABSTRACT OF THE DISCLOSURE

A self-folding wheel structure including a rim member, a tire member formed of a flexible material mounted on the rim member, the tire member having a partition wall therein formed of a flexible material dividing the tire member into two cavities, the partition wall being recessed toward the rim member when the cavities are in an inflated state and means for selectively inflating and successively deflating those portions of the tire member defining the cavities.

---

This invention relates to self-folding structures, and more particularly to an inflatable structure which is adapted to become self-folded upon deflation. This invention particularly is suitable for pneumatic wheel structures of the type used in aircraft landing gear and the like.

In the aircraft art, and particularly rotary wing aircraft, commonly referred to as helicopters, it often is desirable to provide low pressure tires to enable the aircraft to move on ground normally too soft for conventional landing gear wheels. It has been found, however, that it is difficult to provide such low pressure tires in addition to the conventional landing gear wheels, due to space limitations on the aircraft, and particularly in the wheel well of the aircraft.

In addition to inflatable wheel structures, this invention is applicable to any type of inflatable body structure in which it is desirable to reduce the volume of the body into a compact space, the contemplated means for the reduction in volume of the body being a self-contracting operation. The invention further is contemplated for use with objects other than wheel structures, including inflatable pontoons, lifeboats and the like.

Accordingly it is the general object of this invention to provide a self-folding inflatable structure.

Another object of this invention is to provide an inflatable structure which is self-folding upon deflation.

A further object of this invention is to provide an improved wheel structure.

A more specific object of this invention is to provide a novel wheel structure which can be selectively expanded to an operative condition and contracted to a compact inoperative condition.

A still further object of this invention is to provide an inflatable wheel structure which is self-folding upon deflation.

Another object of this invention is to provide a novel low pressure wheel for aircraft which will enable the aircraft to move on soft ground.

A further object of this invention is to provide an inflatable wheel structure for aircraft, which is adapted to be reduced in volume when not in use.

A still further object of this invention is to provide a self-folding inflatable wheel structure for aircraft, which is adapted to be used in addition to a conventional landing gear wheel and further is adapted to be received within the well of the conventional landing gear wheel.

Another object of this invention is to provide a self-folding, low pressure wheel for aircraft, which is comparatively simple in construction.

Other objects and advantages of the present invention will become more apparent to those persons skilled in the art, from the following description taken in conjunction with the accompanying drawings, wherein:

FIGURE 1 is a side elevational view of an embodiment of the invention, having a portion thereof broken away, illustrating the invention in the contracted state;

FIGURE 2 is a front elevational view of the embodiment illustrated in FIGURE 1, having a portion thereof shown in vertical cross-section;

FIGURE 3 is a vertical cross-sectional view of the embodiment shown in FIGURES 1 and 2, illustrating the invention in the expanded state;

FIGURE 4 is an enlarged fragmentary view of the view illustrated in FIGURE 3; and FIGURE 5 is a cross-sectional view taken along line 5—5 in FIGURE 4.

In accordance with the broad aspects of the present invention, there is provided a self-folding structure generally comprising a closed hollow body member, formed of a collapsible material having a partition wall therein, aso formed of a collapsible material, dividing the member into first and second cavities. The portion of the body member bounding the second cavity has greater rigidity than the portion of the wall member bounding the first cavity. Means are provided for selectively expanding and successively contracting those portions of the body member defining the cavities, whereby upon deflating the first cavity of the body member the wall portion bounding the first cavity is caused to collapse and be drawn against the partition wall. Furthermore, upon evacuating the second cavity of the body member, the partition wall also is caused to collapse and the portions of the body member bounding the second cavity are caused to move inwardly and toward the partition wall to enfold the collapsed portion of the body member and the partition wall.

In the preferred embodiment of the invention, the partition wall is arranged to provide a crescent shaped second cavity in the body member when it is in the inflated state and the portion of the body wall bounding the second cavity, disposed adjacent and opposed from the partition wall, is formed with a greater rigidity than the other portion of the body wall and the partition wall, so that upon evacuation of the second cavity, the more rigid portion of the body member is caused to move inwardly and toward the partition wall as previously described.

In lieu of a single closed hollow body member having a partition wall dividing the body member into two separate cavities, it further is contemplated that two separate bodies may be employed to construct the invention. In such a construction, it is contemplated that one of the bodies will be provided with a recess when in the expanded state, and the second body will be disposed on the recessed portion of the first body, so that upon contraction of the second body, it will collapse and come to rest within the recess of the first body, whereupon, the first body may be collapsed to cause the portions thereof other than the recessed portion, to be drawn inwardly and toward the recess thereof to enfold the collapsed first body member.

Referring to the drawings, there is illustrated an embodiment of the invention. Specifically referring to FIGURES 1 through 3, there is illustrated a landing gear structure for an aircraft, including a landing gear strut 10, a conventional landing gear wheel 11 and a self folding landing gear wheel 12. Rigidly mounted on the lower end of the landing gear strut is a laterally projecting hollow axial member 13, the length of which is the maximum permitted by the wheel well opening in the fuselage or wing of the aircraft. Mounted on the free end of the axle member 13 is an axially movable axle member 14. The exterior free end of the axle member 13 is provided with a plurality of longitudinally extending races 15 having ball bearings 16 seated therein. The ball bearings 16 also are received within longitudinally extending races 17 formed on the interior of the axle member 14, and registerable with the races 15, to permit free axial movement, but preventing relative rotational movement between the axle members 13 and 14. The end of the axle member 14 remote from axle member 13 is provided with a cap member 18, which seals the open end thereof. Rigidly mounted on the cap member 18 and extending axially inwardly and through an opening in an end cap 19 of axle member 13 is a bolt member 20 having a nut 21 provided on the threaded end thereof within the shaft member 13. The nut 21 is engageable with the end cap 19 and serves to limit the outward axial movement of the axle member 14 relative to axle member 13. As best illustrated in FIGURE 5, the axle member 14 is maintained in its maximum extended position by spring loaded detents 22 and 23, disposed in the axle member 14 and which are registerable with suitable recesses in the axle member 13.

Mounted on the axle member 14 are axially spaced radial thrust bearings 24 and 25 on which there is mounted a rim member 26. The rim member 26 is constructed of two sections 27 and 28, to permit mounting of the deflatable tire 12. The rim section 27 includes an annular portion 29, which is disposed concentrically relative to the axle member 14 when the rim member is in the assembled position, and an annular flange portion 30 which is seated on bearing 24. The rim section 28 includes a short annular portion 31 on which the free end of annular portion 29 is seated and an annular flange portion 32 which is seated on bearing 24. Suitable seals are provided between the rim member and axle member 14, so that the annular cavity 33 is air tight.

The tire member 12 includes a casing portion 34 and mounting beads 35 and 36, which are mounted on the rim member 26. A sleeve member 37, disposed substantially concentrically with annular section 29 of the rim member, engages the inner surfaces of the mounting beads 35 and 36 and maintains them in spaced relation and in sealing engagement with the annular flange portions 30 and 32 of the rim member. The sleeve member 37 is spaced radially relative to the annular section 29 of the rim member, to provide an annular cavity 38. Provided within the casing member 34 is a partition wall 39, which divides the interior of the tire member into a main cavity 40, having substantially a circular cross-sectional configuration and a cavity 41 having a substantially crescent shaped configuration, when the tire member is in an inflated state, as illustrated in FIGURE 3. Flexible tension members 42 can be provided interconnecting the casing member 34 and the partition wall 39, to maintain the crescent configuration of the cavity 41 when the tire member is in the inflated state. The main cavity 40 communicates with the annular cavity 38 by means of a duct 43.

The components of the tire member 12, including the casing member 34, the mounting beads 36 and 38, the partition wall member 39 and the duct 43 are formed of a flexible material. The portion of the casing member 34 disposed between the mounting beads and juncture of the partition wall 39 with the casing member 34 is constructed with more rigidity than the remaining portion of the casing member and the partition wall member 39. Upon deflation of the cavities, this would permit the less rigid portion of the casing member 34 to collapse and be drawn against the partition wall 39. Then, upon continuing evacuating the crescent shaped cavity 41, the more rigid portions of the casing member bounding the crescent shaped cavity will be caused to move inwardly and toward the rim member to enfold the collapsed portion of the casing member having been drawn against the partition wall member 39.

Mounted on the landing gear strut 10 is a pump member 44, which is connected through a suitable passageway 45 to the interior of the axle member 13. The pump member 44 is operable to selectively supply a fluid under pressure or to evacuate a fluid from the interior of the axle member 13. The end cap 19 is provided with ports 46 and 47 to provide communication between the interior of the axle member 13 and the axle member 14. In addition, the axle member 14 is provided with a port 48. The annular section of the rim member has a port 49 and the sleeve member 37 is provided with a port 50 to provide a fluid passageway from the interior of the axle member 14 through the annular cavities 33 and 38 and through duct 43 to the main cavity 40 of the tire. The sleeve member 37 also is provided with a pair of ports 51 and 52 intercommunicating the annular cavity 38 and the crescent shaped cavity 41. The annular port 51 has a one way valve 53, which only permits fluid to enter from annular cavity 38 into the crescent shaped cavity 41. The port 52 is provided with a spring biased one way valve 54, which only permits fluid to flow out of the crescent shaped cavity 41 into the annular cavity 38. The tension of the spring for the valve 54 is adjusted, so that the valve will open only when a predetermined pressure differential across the valve is reached. This pressure differential is reached only after the main cavity 40 of the tire member has been substantially evacuated and the less rigid portion of the casing member 34 has been caused to be drawn against the partition wall member 39.

A bellows member 55 is provided to prevent foreign matter from contacting the axial bearing races 16. One end of the bellows member is secured to a mounting plate 56 mounted on the lower end of the landing gear strut 10, and the other end thereof is secured to a mounting plate 57 mounted on the annular flange portion 30 of the rim member. Preferably, the bellows member provides a seal to prevent leakage of fluid from the interior of the axle section 14 and annular cavity 33.

When the inflatable tire member 12 is not in use, it is in the position as illustrated in FIGURES 1 and 2. When it is desired to employ the tire member, the pilot of the aircraft through a suitable control system, actuates the pump member 44 to supply a fluid under pressure to the interior of the axle member 13. The fluid under pressure then passes through ports 46 and 47 in end cap 19 and causes the axle member 14 to extend to its maximum position. Eventually, the bolt 21 will engage the end cap 19 to limit the movement of the axle member 14. Fluid also is caused to flow through port 48, cavity 33, port 49, cavity 38, port 50 and duct 43 into main cavity 40. Simultaneously, fluid will flow through port 51 into the crescent shaped cavity 41 to inflate the entire tire member 12. The pressure of fluid supplied to the tire is regulated, as desired, to provide a predetermined low pressure in the tire member 12.

When it is desired to deflate the tire and contract it into a compact unit, the pilot by means of the control system, actuates the pump member to evacuate air from the inflatable tire system. Initially, the fluid primarily is evacuated from the main cavity 40, whereby the ambient air pressure acting on the tire, causes the less rigid portion of the casing member, bounding the main cavity, to collapse and be drawn against the partition wall member 39. As vacuum continues to be applied to the system, eventually the pressure differential across the valve member 54 will be sufficient to overcome the force of the spring to open the valve. At this point, the pressure within the crescent shaped cavity 41 will begin to decrease. As the pressure within the cavity 41 decreases below that ambient air pressure, the atmospheric pressure acting against the portion of the casing member bounding the crescent shaped cavity forces the same inwardly and toward the rim member. These walls react in compression against the tension in the partition wall member caused by the atmospheric pressure. These combined forces cause the bending of the casing member bounding the crescent shaped cavity, so that the upper ends thereof move inwardly towards each other and then roll inwardly to provide the folded unit, as illustrated in FIGURE 2.

Although a vacuum has been described as a means for collapsing the various components of the tire member, it also will be understood that other means, including mechanical means, can be employed in folding the components of the tire member, as described. In addition, various other components, including elastic materials and springs, can be employed to assist or control the folding process.

Although the above mentioned embodiment has been described in terms of providing a partition wall to provide a main cavity and a crescent shaped cavity within the inflatable tire member, it further will be understood that other cavity configurations can be employed to achieve the same results.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What I claim is:

1. A self-folding wheel structure comprising a rim member, a tire member formed of a flexible material mounted on said rim member, said tire member having a partition wall therein formed of a flexible material, dividing said tire member into two cavities, said partition wall being recessed toward said rim member when said cavities are in an inflated state and means for selectively inflating and successively deflating those portions of said tire member defining said cavities.

2. A self-folding wheel structure comprising a rim member, a tire member formed of a flexible material mounted on said rim member, said tire member having a partition wall therein formed of a flexible material, dividing said tire member into two cavities, said partition wall being recessed toward said rim member when said cavities are in an inflated state, the portions of the tire member disposed between the rim member and the juncture of the partition wall with the tire member having greater rigidity than the other portions of the tire member, including the partition wall, and means for selectively inflating and successively deflating those portions of said tire member defining said cavities.

3. A self-folding wheel structure comprising a rim member, a tire member formed of a flexible material mounted on said rim member, said tire member having a partition wall therein formed of a flexible material dividing said tire member into two cavities, one cavity having a substantially crescent shaped cross-sectional configuration with the recessed portion thereof projecting toward the rim member when said cavities are in an inflated state and means for selectively inflating and successively deflating those portions of the tire member defining said cavities.

4. A self-folding wheel structure comprising a rim member, a tire member formed of a flexible material mounted on said rim member, said tire member having a partition wall therein formed of a flexible material dividing said tire member into two cavities, one of said cavities having a crescent shaped cross-sectional configuration with the recessed portion thereof projecting toward the rim member when said cavities are in an inflated state, the portions of the time member disposed between the rim member and the juncture of the partition wall with the tire member having greater rigidity than the other portions of the tire member, including the partition wall, and means for selectively inflating and successively deflating those portions of said tire member defining said cavities.

5. A self-folding wheel structure comprising a rim member, a tire member formed of a flexible material mounted on said rim member, said tire member having a partition wall therein formed of a flexible material, dividing said tire member into two cavities, a main cavity and a cavity having a crescent shaped cross-sectional configuration with the recessed portion thereof projecting towards the rim member when said cavities are in an inflated state, the portions of the tire member disposed between the rim member and the juncture of the partition wall with the tire member having greater rigidity than the other portions of the tire member, including the partition wall, means for selectively applying and removing a fluid under pressure to said cavities for selectively inflating and deflating said cavities, fluid passage means intercommunicating said fluid applying and removing means and said cavities and said fluid passage means having valve means permitting deflation of said crescent shaped cavity only after the main cavity has been exhausted whereby the portion of the tire member bounding said main cavity is caused to collapse first and be drawn toward said partition wall whereupon the portions of the tire member bounding said crescent shaped cavity are caused to move inwardly and toward the rim member to enfold the collapsed portion of the tire member.

6. A self-folding wheel structure comprising a rim member, a tire member formed of a flexible material mounted on said rim member, said tire member having a partition wall therein formed of a flexible material, dividing said tire member into two cavities, a main cavity and a cavity having a crescent shaped cross-sectional configuration with the recessed portion thereof projecting toward the rim member when said cavities are in an inflated state, the portions of the tire member disposed between the rim member and the juncture of the partition wall with the tire member having greater rigidity than the other portions of the tire member, including the partition wall, means for selectively applying and removing a fluid under pressure to said cavities and selectively inflating and deflating said cavities, fluid passage means intercommunicating said fluid applying and removing means and said cavities and said fluid passage means having valve means operative responsive to the exhausted condition of said main cavity to permit exhausting of said crescent shaped cavity whereby upon evacuating fluid from said cavities the portion of the tire member bounding said main cavity is caused to collapse first and be drawn toward said partition wall whereupon the portions of the tire member bounding said crescent shaped cavity are caused to move inwardly and toward the rim member to enfold the collapsed portion of the tire member.

7. A self-folding wheel structure comprising a closed rim member, a tire member formed of a flexible material mounted on said rim member, said tire member having a partition wall therein formed of a flexible material, dividing said tire member into two cavities, a main cavity and a cavity having a crescent shaped cross-sectional configuration with the recessed portion thereof projecting towards the rim member when said cavities are in an inflated state, the portions of the tire member disposed between the rim member and the juncture of the partition wall with the tire member having greater rigidity than the other portions of the tire member, including the partition wall, means operatively connected to said rim member for selectively applying and removing fluid under pressure to the interior of said rim member, a first fluid passage means intercommunicating the interior of the tire rim and the main cavity, a second fluid passage means intercommunicating the interior of said rim member and said crescent shaped cavity, said second mentioned fluid passage means having valve means operative responsive to the exhausted condition of said main cavity to permit exhausting of said crescent shaped cavity whereby upon evacuating fluid from said cavities the portion of the tire member bounding said main cavity is caused to collapse first and be drawn toward said partition wall whereupon the portions of the tire member bounding said crescent shaped cavity are caused to move inwardly and toward the rim member to enfold the collapsed portion of the tire member.

8. A self-folding wheel structure comprising a closed rim member, a tire member formed of a flexible material mounted on said rim member, said tire member including a casing portion and mounting beads mounted on the rim member, said tire member having a partition wall therein formed of a flexible material dividing said tire member into two cavities, a main cavity and a cavity having a substantially crescent shaped cross-sectional configuration with the recessed portion thereof projecting toward the rim member when said cavities are in an inflated state, the portions of the tire member disposed between the rim member and the juncture of the partition wall with the tire member having greater rigidity than the other portions of the tire member, including the partition wall, a rigid sleeve disposed about said rim member maintaining the mounting beads of said tire member in spaced relation and in sealing engagement with said rim member, means operatively connected to said rim member for selectively applying and removing fluid under pressure to the interior of said rim member, a first fluid passage means intercommunicating the interior of the rim member and said main cavity, a second fluid passage means intercommunicating the interior of said rim member and said crescent shaped cavity, and said second fluid passage means having a first one way valve means permitting air under pressure to be introduced into said crescent shaped cavity and a second one way valve means permitting the flow of fluid out of said crescent shaped cavity responsive to a predetermined pressure differential across said second one way valve.

9. A self-folding wheel structure comprising a first axle section having fluid passage means therein, a second hollow axle section mounted on said first axle section for axial movement relative to said first axle section, means for selectively applying and removing fluid under pressure mounted on said first axle section, said fluid passage means in said first axle section intercommunicating said means for applying and removing fluid under pressure and the interior of said second axle section, a closed rim member rotatably mounted on said second axle section, said rim portion including an annular section disposed in spaced relationship relative to said second axle section and axially spaced annular flange sections, a tire member formed of a flexible material mounted on said rim member, said tire member including a casing portion and mounting beads mounted on the rim member, a rigid sleeve disposed about said rim member in spaced relation to said annular section of said rim member maintaining and mounting beads of said tire member in spaced relation and in sealing engagement with the flange sections of said rim member, said tire member having a partition wall therein formed of a flexible material dividing said tire member into two cavities, a main cavity and a cavity having a substantially crescent shaped cross-sectional configuration with the recessed portion thereof projecting toward said rim member when said cavities are in inflated state, the portions of the tire member disposed between the rim member and the juncture of the partition wall with the tire member having greater rigidity than the other portions of the tire member, including a partition wall, said second axle member having a port intercommunicating the interior of said second axle member and the chamber formed between said second axle member and the annular section of said rim member, said annular section of said rim member having a port therein, fluid passage means intercommunicating the main cavity of said tire member and the cavity formed between the annular section of said rim member and said rigid sleeve member, said rigid sleeve member having a port communicating with said crescent shaped cavity including a one way valve member permitting entry of fluid into said crescent shaped cavity and said rigid sleeve member having a second port including a one way valve member operable responsive to a predetermined pressure differential across the valve member to permit the flow of fluid out of said crescent shaped cavity whereby upon applying fluid under pressure to said fluid passage means in said first axle section, the second axle section will be caused to extend axially and fluid will flow to said cavities to inflate the same and upon applying suction to said fluid passage means in said first axle section the main cavity will first be exhausted to cause the wall thereof to collapse and engage said partition wall, developing said pressure differential across said second mentioned valve member to open the same and permit said crescent shaped cavity to be exhausted whereupon the outer walls of said crescent shaped cavity will be caused to move inwardly and toward said rim section to enfold the collapsed wall section of said main cavity and said second axle section will be caused to move axially toward said first axle section after the outer wall sections of said crescent shaped cavity have engaged and enfolded the wall of said main cavity.

References Cited

UNITED STATES PATENTS

| | | | |
|---|---|---|---|
| 466,548 | 1/1892 | Woodward | 152—333 X |
| 598,460 | 2/1898 | Young | 152—339 |
| 847,231 | 3/1907 | Bryce | 152—339 |
| 2,226,453 | 12/1940 | Vretman | 152—339 |
| 2,955,635 | 10/1960 | Miller | 152—330 |

ARTHUR L. LA POINT, *Primary Examiner.*

Y. P. SCHAEVITZ, *Assistant Examiner.*